100
UNITED STATES PATENT OFFICE.

ROBERT M. THOMPSON, OF NEW YORK, N. Y.

PROCESS OF OBTAINING AND SEPARATING SULPHIDE OF NICKEL.

SPECIFICATION forming part of Letters Patent No. 489,575, dated January 10, 1893.

Application filed June 20, 1892. Serial No. 437,365. (No specimens.)

*To all whom it may concern:*

Be it known that I, ROBERT M. THOMPSON, a citizen of the United States, and a resident of the city, county, and State of New York, have invented certain new and useful improvements in processes of obtaining sulphide of soda for use in producing sulphide of nickel and the method of obtaining and separating said sulphide by the use thereof, of which the following is a specification.

My invention relates to an improvement in the method or process of obtaining sulphide of soda for use as a flux; in methods or processes for producing and separating commercially pure sulphide of nickel for use in metallurgical operations; in the treatment of mattes of copper, nickel, iron, and other metals, as the same result from the various operations of ore smelting, and in two certain applications for Letters Patent of the United States heretofore filed by me in the United States Patent Office Serial Nos. 424,866 and 437,364 I have particularly described certain processes in which the separation of nickel sulphide is effected by the addition of certain chemical re-agents, which not alone change the chemical composition of the smelted mass, but also tend to produce after smelting great fluidity in the mass, whereby the various metals or salts of metal contained therein assume upon cooling, by reason of their varying specific gravity, such relative positions with reference to each other, that they may be readily separated by mechanical means, or by hand. When as described in the aforesaid applications nickel is combined with other metals, as for instance iron and copper, or either of them in an ordinary matte produced from or by the primary treatment of the ores of these metals, in the ordinary operation of smelting in any convenient form of furnace, they exist probably as a combined molecule and the affinity of the various metals for the sulphur is different, and when the mattes or other substances containing nickel are treated with a certain class of alkalies or salts of alkaline metal or ammonium, rich in oxygen, such as carbonates of the various alkaline metal or ammonium or caustic alkalies, such as potash or soda or either of them, or any of them mixed together, the combined molecule is split up, and the nickel is desulphurized and changed either into a crude metallic form, or into a sulphide differing from that in which it existed in the ore, in chemical composition, and containing more or less sulphur, according to conditions, and the products of the smelting operation, so far as it consists of this crude nickel or nickel sulphide, will be of greater specific gravity than the other metals and may be readily separated therefrom.

When any of the substances above mentioned are added to a charge of matte, in a cupalo, or blast furnace, in suitable quantities the caustic alkali or carbonate tends to absorb a portion of the sulphur from the matte, and to form a sulphide of the particular alkaline metal or ammonium which is employed. In so doing it breaks up the combined molecule in which the metals exist, and takes from part of the metals the greater part of the sulphur combined in them. As under these conditions the sulphur has a less affinity for the nickel than for the other metals, a proportionately larger amount of nickel, than of the other metals is reduced to a metallic state, and when the smelted mass is tapped after smelting from the furnace, and allowed to cool, in an ordinary cooling bed, or in any mold or slag pot, two distinct compounds will be found to have been produced, which differ in specific gravity and will assume with reference to each other the relative position of layers or strata, and which are called "tops" and "bottoms" according to their position. The "tops" so called, consist of sulphide of the alkaline metal or ammonium, sulphide of copper and some sulphide of iron and nickel, while the "bottoms" consist of a small amount of alkali and copper iron and nickel in crude metallic state and perhaps a little sulphide of these metals, the proportion of the nickel being largely in excess of the proportion of the iron and copper.

The separation of the "tops" from the "bottoms" may be effected if desired while they are still liquid by allowing the mass to settle, and then siphoning or pouring off the former in any convenient manner, for the reason that in practice the "bottoms" solidify rapidly while the "tops" remain liquid. When the so called "bottoms" resultant from this separation or step in the separation are subjected to further treatment by again smelting or melting in any shaft or other suitable furnace, with any sulphide, of an alkaline metal or ammonium such as sulphide of soda, containing preferably an excess of free sulphuric acid, the metals by re-absorbing sulphur from the sulphide of soda will be reconverted into sulphides and the soda converted into caustic soda. The tendency of the sulphides thus formed is not to form a compound molecule such as existed in the original ore, or matte, but separate molecules, of sulphides of the various metals present.

The copper and iron associated with the metallic nickel in the "bottoms" resultant from the first treatment with caustic alkalies or carbonates of an alkaline metal or ammonium, exists either as a different sulphide from that in which it existed before, or in a lower sulphide and when the sulphide of soda is added or other sulphides of an alkaline metal or ammonium are added with an excess of carbon, first the copper, then the iron, and finally the nickel, take up sulphur from it, and the lower sulphides existing in the bottoms with the crude nickel are converted into full sulphides. These higher sulphides coalesce with the soda or other base of the alkaline metal or ammonium and form a mass which is very light. The lower sulphides of the metal do not so coalesce, and are precipitated to the bottom, and by repeating the operation all the lower sulphides of iron and copper are converted into higher sulphides and are thus separated from the lower sulphide of nickel. If now the nickel sulphide settling in the bottom be separated by mechanical means, or by hand and subjected to repeated treatment by smelting with sulphide of soda, any number of times, the iron and copper may be still further separated and eventually a sulphide of nickel will be produced which is commercially pure.

The present invention relates to more particularly a method of supplying the sulphide of soda for use as a reagent in the second step of the above described processes. Under ordinary conditions sulphide of soda being a substance which is not very often used except upon a small scale, is difficult and expensive to procure.

Now I have discovered that when ordinary niter cake or salt cake of commerce or other salt of soda and sulphuric acid as may be found most convenient is charged into the furnace with the crude nickel of the "bottoms" resultant from the treatment with caustic alkalies or carbonates of the alkaline metal or ammonium, and preferably salt cake or niter cake which contains an excess of free sulphuric acid, the sulphate of soda of the niter or salt cake, according to which ever be used is when treated in a cupola or blast furnace in the presence of carbon at once converted into sulphide of soda, which unites with the crude metals in the bottoms and the reactions above described take place precisely in the same manner as before.

Salt cake or niter cake can be readily procured at reasonable prices in many localities, and the carbon is readily supplied by the fuel of the furnace.

When it is desired to repeat the separation by sulphide of soda, the bottoms are again smelted with salt or niter cake in a shaft furnace in the presence of carbon and the smelted mass allowed to settle and is then separated as before.

The smelting operation may be carried out in any convenient form of furnace and the separation effected as above indicated either by siphoning off after settling before cooling, or by mechanical separation after the smelted mass has become hard. The sulphide of nickel thus separated may be subjected to further metallurgical treatment, and be reduced to metallic nickel and sold as such or it may be converted into oxide of nickel and sold, or sold directly as sulphide, according to the purpose for which the nickel is required.

I claim as my invention:

1. The hereinbefore described method of producing and separating sulphide of nickel, consisting in smelting the ore, mattes or other bodies containing nickel with a suitable reagent or flux, substantially as set forth, whereby the nickel is converted into crude metallic nickel, in allowing the crude nickel to settle and separate by gravity, in separating the same after settling, and resmelting with niter or salt cake substantially as set forth, with an excess of carbon, whereby the niter or salt cake is decomposed and sulphide of soda formed, which unites with the crude nickel to form nickel sulphide, and in allowing the nickel sulphide to settle and separate by specific gravity and in separating the same after settling.

2. The hereinbefore described method of producing sulphide of soda for use in producing nickel sulphide from crude nickel, consisting in smelting the crude nickel with commercial salt cake or niter cake with an excess of carbon, whereby the cake is decomposed, and sulphide of soda formed, which unites with nickel to form nickel sulphide.

3. The hereinbefore described method of producing and separating sulphide of nickel from crude nickel by smelting the same with commercial niter cake or salt cake or other similar soda salt in a furnace with an excess of carbon whereby the soda salt is decomposed and sulphide of soda formed, which unites with the nickel to form nickel sulphide, in allowing the latter to settle and separate by specific gravity, and in separating the same after settling.

In testimony that I claim the foregoing as my invention I have signed my name, in presence of two witnesses, this 3d day of June, 1892.

ROBERT M. THOMPSON.

Witnesses:
C. VAN BRUNT,
J. W. CLARK.